(12) United States Patent
Wang et al.

(10) Patent No.: US 8,351,378 B2
(45) Date of Patent: Jan. 8, 2013

(54) METHOD FOR DEACTIVATING ISR AND A MOBILITY MANAGEMENT UNIT

(75) Inventors: Jing Wang, Shenzhen (CN); Shuang Liang, Shenzhen (CN); Jinguo Zhu, Shenzhen (CN); Fei Lu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 254 days.

(21) Appl. No.: 13/002,138

(22) PCT Filed: Jun. 3, 2009

(86) PCT No.: PCT/CN2009/072112
§ 371 (c)(1),
(2), (4) Date: Dec. 30, 2010

(87) PCT Pub. No.: WO2010/000167
PCT Pub. Date: Jan. 7, 2010

(65) Prior Publication Data
US 2011/0128915 A1    Jun. 2, 2011

(30) Foreign Application Priority Data
Jul. 1, 2008    (CN) .......................... 2008 1 0130692

(51) Int. Cl.
*H04W 4/00*    (2009.01)
(52) U.S. Cl. ....................... 370/328; 370/401
(58) Field of Classification Search .................. None
See application file for complete search history.

(56) References Cited

U.S. PATENT DOCUMENTS

| | | | | |
|---|---|---|---|---|
| 8,169,956 | B2* | 5/2012 | Malladi | 370/329 |
| 8,203,997 | B2* | 6/2012 | Zhao et al. | 370/328 |
| 2008/0102831 | A1 | 5/2008 | Ore | |
| 2008/0320149 | A1* | 12/2008 | Faccin | 709/228 |
| 2009/0245177 | A1* | 10/2009 | Zhao et al. | 370/328 |
| 2009/0262736 | A1* | 10/2009 | Zhao et al. | 370/389 |
| 2010/0135245 | A1* | 6/2010 | Zhu et al. | 370/331 |
| 2011/0110308 | A1* | 5/2011 | Liang et al. | 370/328 |
| 2011/0110350 | A1* | 5/2011 | Lu et al. | 370/338 |
| 2012/0020347 | A1* | 1/2012 | De Vega De La Red | 370/338 |
| 2012/0246255 | A1* | 9/2012 | Walker et al. | 709/208 |

OTHER PUBLICATIONS

"Annex J (Informative): High Level ISR Flows," Release 8, 3GPP TS 23.401 V8.2.0, 177-178, Jun. 2008.
"GUTI Reallocation Procedure," Release 8, 3GPP TS 23.401 V8.2.0, 77-81, Jun. 2008.
International Search Report for International Application No. PCT/CN2009/072112, dated Sep. 10, 2009.
International Preliminary Report on Patentability and Written Opinion of the International Searching Authority for International Application No. PCT/CN2009/072112, dated Sep. 10, 2009.

* cited by examiner

*Primary Examiner* — Bob Phunkulh
(74) *Attorney, Agent, or Firm* — Clark & Elbing LLP

(57) ABSTRACT

The present invention discloses a method for deactivating ISR and a mobility management unit. Wherein the above method includes: when an ISR deactivation is needed to be performed, the mobility management unit judging whether to perform the following operation by the S-GW according to reasons of the ISR deactivation: the mobility management unit sends a request message of deleting bearer to the S-GW, and carries, in the request message, an identifier which is used to instruct the S-GW to initiate the bearer deletion to the other mobility management unit associated with the ISR function activation; or the mobility management unit notifies the other mobility management unit associated with the ISR function activation to perform the ISR deactivation. The synchronization between the bearer deletion and the network element state in the ISR function deactivation scenarios can be realized by the above technical scheme.

20 Claims, 7 Drawing Sheets

METHOD FOR DEACTIVATING ISR AND A MOBILITY MANAGEMENT UNIT

CROSS-REFERENCE TO RELATED APPLICATIONS

This application is the U.S. national stage filing under 35 U.S.C. §371 of international application PCT/CN2009/072112, filed Jun. 3, 2009, which claims benefit of Chinese Patent Application CN 200810130692.6, filed Jul. 1, 2008.

FIELD OF THE INVENTION

The present invention relates to communication field, in particular to a method for deactivating an Idle mode Signaling Reduction (ISR) function and a mobility management unit.

BACKGROUND OF THE INVENTION

In order to maintain the competitive ability of the $3^{rd}$ generation mobile communication system in the communication field, the $3^{rd}$ Generation Partnership Project (3GPP) standard workgroup has been focusing on the research on the Evolved Packet System (EPS). FIG. 1 is an architecture diagram of an EPS according to related art. As shown in FIG. 1, the EPS system mainly comprises the two parts: an Evolved Universal Terrestrial Radio Access Network (E-UTRAN) and an Evolved Packet Core (EPC). The EPC of this system can support a user to access via a GSM EDGE radio access network (GERAN) and a Universal Terrestrial Radio Access Network (UTRAN).

The EPC mainly comprises a Home Subscriber Server (HSS), a Mobility Management Entity (MME), a Serving Gateway (S-GW), a Packet Data Network Gateway (PDN Gateway, P-GW), a Serving GPRS Support Node (SGSN) and a Policy and Charging Rules Function Entity.

As shown in FIG. 1, the UTRAN/GERAN and the SGSN are connected to each other via an Iu interface, the SGSN and the HSS are connected to each other via a Gr interface, the MATE and the HSS are connected to each other via an S6a interface, the MME and the SGSN are connected to each other via an S3 interface, the E-UTRAN and the S-GW are connected to each other via an S1-U interface, the S-GW and the P-GW are connected to each other via an S5 interface, the S-GW and the SGSN are connected to each other via an S4 interface, the P-GW and the packet data network are connected to each other via an SGi interface, the E-UTRAN and the MME are connected to each other via an S1-MME interface, the P-GW and the Policy and Charging Rules Function Entity are connected to each other via a Gx interface, the packet data network and the Policy and Charging Rules Function Entity are connected to each other via a Rx+interface.

In particular, the HSS is the permanent storage point of the user subscribed data and is located in the home network subscribed by the user; the MME is the storage point of the user subscribed data in the current network and responsible for a signaling management of the Non-Access Stratum (NAS) from a terminal to the network, tracking and paging management function and bearer management in a user idle mode; the S-GW is the gateway from the core network to the radio system and responsible for the user plane bearer from the radio access network to the core network, data buffering in a terminal idle mode to initiate a service request, legal monitoring, packet data routing and forwarding function; the P-GW is the gateway of the EPS and the external network of this network and responsible for the functions such as charging function, packet filtering, policy application and IP address allocation of the terminal; the SGSN is the service support point for the GERAN and UTRAN user accessing the EPC network, similar to the MME in function, and responsible for the functions such as paging management and bearer management and location updating of the user.

When a change occurs to the coverage region located by a UE, for instance, when traveling from one kind of Radio Access Technology (RAT) coverage region to another kind of RAT coverage region, the UE finds that it enters an unregistered region through monitoring a broadcast channel. In order to ensure the continuity of the service between the UE and the core network, it is necessary to register under the new RAT coverage region, therefore, the UE initiates an inter RAT Tracking Area Update (TAU) or a Routing Area Update (RAU) process.

For a dual-mode UE at the overlapped area or the neighboring region of the UTRAN/GERAN coverage region and the E-UTRAN coverage region, the UE frequently initiates the TAU or RAU process in the two registering region, due to the reasons such as frequently shifting between the two coverage regions or the signal intensity in the overlap area, and it will result in a heavy load of the air interface. Therefore, in the EPS system, the ISR function was introduced to reduce the air interface signaling between the UE and the core network. After this function is activated, the UE which has both the UTRAN/GERAN and the E-UTRAN access function at the same time may register to the MME and the SGSN at the same time, however, the UE registering to the MME and the SGSN via the two access networks respectively are independent. Thus in the above situations, the UE with the activated ISR will not frequently initiate the TAU or RAU process at the neighboring area or the overlapped area of two coverage, thereby, the unnecessary air interface signaling is reduced to save the air interface resource.

In order to ensure the ISR functions properly, the context information of the UE in both the two mobility management units (the MME and the SGSN) need to be kept, and the S-GW is required to save the bearer information of the UE under the two different access technologies. However, when the ISR function can not be kept (i.e., the ISR function is deactivated) due to the reasons such as powering off the UE, detaching from the network, and changing the S-GW, the core network needs a mechanism to ensure that the useless UE context information and the bearer information are released, and to synchronize the ISR states of the UE and the core network side mobility management unit, so as to prevent the information resource from being wasted and avoid the error resulted from the asynchronism of the ISR states.

As to different ISR deactivation scenarios, the prior art employs different treatment modes which are described below.

Scenario 1, when the UE travels to the MME/SGSN which is/are not the two mobility management units with the activated ISR, the TAU/RAU process is needed to be initiated, at this time, the MME/SGSN can only acquire the context information from one of the previously registered mobility management units, it is possible that a activation is needed because the registered context information of the SGSN/MME when ISR function is previously activated cannot be obtained properly which result in that the ISR function can not be kept and is required to deactivated. At this time, one mobility management unit, in which the UE was located previously and whose ISR function is activated, initiates a request for updating or deleting bearer to trigger the S-GW to actively initiate the deleting bearer request to the other mobility management unit with the ISR function being activated.

Scenario 2, when the UE powers off and detaches from the network, the ISR function also needs to be deactivated. In this situation, the mobility management unit in which the UE is located and the ISR function is activated may initiate the deleting bearer request to the S-GW, and may send a detachment instruction to the other mobility management unit associated with the ISR function activation, at this time, the other mobility management unit associated with the ISR function activation is responsible for initiating the deleting bearer request to the S-GW. By this process, both of the two mobility management units associated with the ISR function have deleted the context information of the UE and the bearer information of the S-GW.

Scenario 3, when the network initiates a detachment process which is merely a detachment of an access technology, at this time, the UE may also attach to another access technology. The ISR function also needs to be deactivated in this scenario. But when the S-GW receives a deleting bearer request from a mobility management unit with an ISR function being activated, the deleting bearer request shall not be sent to the other mobility management unit associated with the ISR function activation.

It can be seen from the operation modes of the ISR deactivation of the above first two scenarios, that the behaviors that the S-GW performs towards the deleting bearer request from the mobility management units with the ISR function being activated can not be the same. If Scenario 1 is satisfied, i.e., the S-GW will send the deleting bearer request to the other mobility management unit associated with the ISR activation upon receiving the deleting bearer request from one party; then in Scenario 2, there will be deleting bearer requests in both the direction from the other mobility management unit associated with the ISR function activation to the S-GW and the direction from the S-GW to this mobility management unit, the deleting bearer requests is not only conflict with each other but also redundant.

But in Scenario 3, there is no solution of the ISR deactivation. If the operation mode of Scenario 1 is used, an error operation will occur because the S-GW need not delete the bearer to the other mobility management unit associated with the ISR function deactivation. However, if the S-GW does not send the deleting bearer signaling to the mobility management unit, it can not obtain the information of the current deactivated ISR, at this time, the asynchronsim of the ISR deactivation states will bring into a subsequent flow error; if the operation mode of Scenario 2 is used, the other mobility management unit associated with the ISR function activation will acquire the state information of the ISR deactivation, but the detachment will also occur to the UE, which is an error operation.

Therefore, there is a need for a technology which can avoid the error operation of the ISR function deactivation under the above scenarios.

SUMMARY OF THE INVENTION

Considering the problems existed in prior art that the asynchronism between bearer deletion and network element state in the scenarios of ISR function deactivation, the present invention aims to provide a method for deactivating ISR and a mobility management unit, so as to solve one of the above problems.

According to one aspect of the present invention, a method for deactivating ISR is provided.

The method for deactivating ISR according to the present invention is applicable to a system comprising an S-GW and two mobility management units associated with ISR function activation.

The method comprises: when an ISR deactivation is needed to be performed, the mobility management unit judging whether it is necessary to send a request message of deleting bearer to the S-GW, and carrying, in the request message, an identifier which is used to instruct the S-GW to initiate bearer deletion to the other mobility management unit associated with the ISR function activation; or to notify the other mobility management unit associated with the ISR function activation to perform the deactivation.

The reasons of the ISR deactivation comprise: a detachment resulted from user equipment power-off, an ISR deactivation caused by a network element shift resulted from the change of users' location, and a kind of the network detachment initiated by the mobility management unit or a home subscriber server.

When the reason of the ISR deactivation is the detachment resulted from the user equipment power-off or the ISR deactivation caused by the network element shift resulted from the change of users' location, the mobility management unit determines that it is necessary to initiate the bearer deletion by the S-GW; when the reason of the ISR deactivation is the kind of the network detachment initiated by the mobility management unit or the home subscriber server, the mobility management unit determines that it is unnecessary to initiate the bearer deletion by the S-GW.

When the reason of the ISR deactivation is the detachment resulted from the user equipment power-off or the ISR deactivation caused by the network element shift resulted from change of users' location, the mobility management unit sends the request message of deleting bearer to the S-GW, and carrying, in the request message, an identifier which is used to instruct the S-GW to initiate bearer deletion to the other mobility management unit associated with the ISR function activation. When the reason of the ISR deactivation is the kind of the network detachment initiated by the mobility management unit or the home subscriber server, the mobility management unit notifies the the other mobility management unit associated with the ISR function activation to perform the ISR deactivation.

After the mobility management unit sending the request message of deleting bearer to the S-GW and carrying the identifier of bearer deletion, the above method further comprises: the S-GW initiating a deleting bearer request to the other mobility management unit associated with the ISR function activation; the other mobility management unit associated with the ISR function activation performing the bearer deletion in response to the deleting bearer request, returning a response message and setting its ISR state as deactivation.

Wherein the mobility management unit is a mobility management entity or a serving GPRS support node.

According to another aspect of the present invention, a mobility management unit is provided.

The mobility management unit according to the present invention comprises: judging means, when an ISR deactivation is needed, configured to judge whether it is necessary to initiate a bearer deletion by an S-GW according to reasons of the ISR deactivation; first processing means, configured to send a request message of deleting bearer to the S-GW, and to carry an identifier, in the request message, which is used to instruct the S-GW to initiate the bearer deletion to the other mobility management unit associated with ISR function activation; second processing means, configured to notify the other mobility management unit associated with the ISR function activation to perform the ISR deactivation; wherein the first processing means is executed when the judging result of the judging means is necessary; otherwise, the second processing means is executed.

The above judging means is also configured to judge whether the reasons of the ISR deactivation is a detachment resulted from the user equipment power-off or a network element shift resulted from the change of users' location, or a network detachment initiated by the mobility management unit or a home subscriber server; wherein when the ISR deactivation is caused by the detachment resulted from the user equipment power-off or the network element shift resulted from the change of a user location, the first processing means is executed; when the ISR deactivation is caused by the network detachment initiated by the mobility management unit or a home subscriber server, the second processing means is executed.

Wherein the mobility management unit is a mobility management entity or a serving GPRS support node.

By at least one of above technology schemes of the present invention, the synchronism asynchronism between bearer deletion and network element state in the scenarios of ISR function deactivation can be realized by the judgement of the mobility management unit on whether to instruct the S-GW to initiate the bearer deletion to the other mobility management unit associated with the ISR function activation or notify the other mobility management unit associated with the ISR function activation to perform the ISR deactivation according to the reasons of the ISR deactivation.

Other features and advantages of the present invention will be detailed in the following description, and partly obvious from the description, or can be understood through implementing the present invention. The purposes and other advantages of the present invention can be achieved and obtained through the structure specified by the written specification, claims and drawings.

BRIEF DESCRIPTION OF THE DRAWINGS

The Drawings are provided for a further understanding of the present invention and form a part of the specification. The exemplary embodiments and the drawing are used to explain the present invention without unduly limiting the scope of the present invention, wherein.

DETAILED DESCRIPTION OF THE EMBODIMENTS

Figure 1:
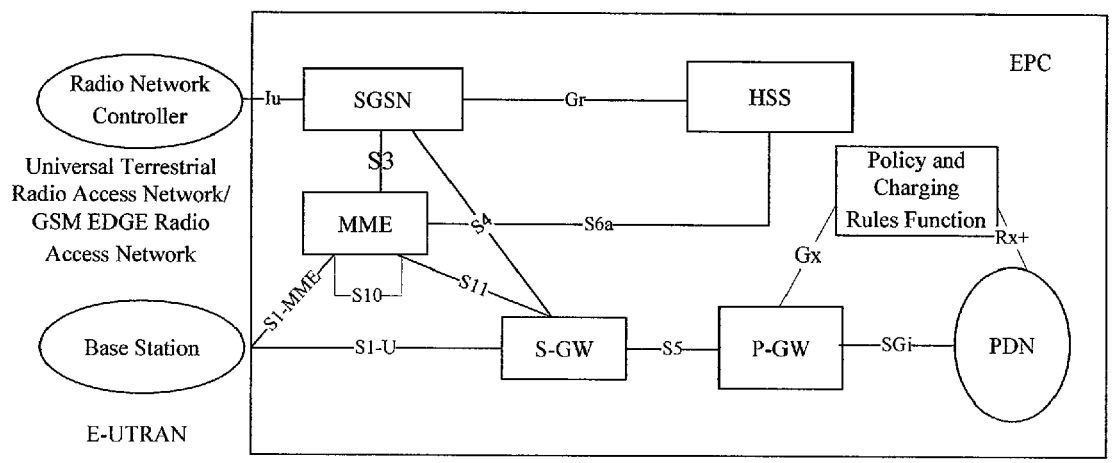
FIG. 1 is the architecture diagram of the EPS system according to a related art.

The preferred embodiments of the present invention will be described hereinafter in detail in conjunction with the drawings thereof. It is to be noted that the preferred embodiments described herein are merely used to explain rather than limit the present invention.

According to the embodiments of the present invention, a method for realizing an ISR deactivation is provided, and the method is applied to a system comprising an S-GW and two mobility management units associated with ISR function activation.

As described above, since the S-GW itself can not distinguish which scenario the deleting bearer requests from the mobility management unit (MME/SGSN) is in, it is necessary to have a particular processing instruction so as to perform different operations according to different demands. Thereby, in the method for deactivating the ISR according to the embodiments of the present invention, the mobility management unit judges whether the S-GW is necessary to actively initiate the bearer deletion or to notify the other mobility management unit associated with the ISR function activation to perform the ISR deactivation according to different ISR deactivation scenarios.

In particular, when the ISR deactivation is needed to be executed, the mobility management unit performs determination according to the reasons of the ISR deactivation; under the situation that the ISR deactivation is caused by a detachment resulted from the user equipment power-off or the network element shift resulted from change of users' location, the mobility management unit determines that it is necessary to initiate a bearer deletion by the S-GW, and the mobility management unit sends a request message of bearer deletion to the S-GW, and carries, in the request message, an identifier which is used to instruct the S-GW to initiate the bearer deletion to the other mobility management unit associated with the ISR function activation; under the situation that the ISR deactivation is caused by a kind of the network detachment initiated by the mobility management unit or a home subscriber server, the mobility management unit determines that it is unnecessary to initiate the bearer deletion by the S-GW, and notifies the other mobility management unit associated with the ISR function activation to perform the ISR deactivation. Wherein under the two situations described above, the operation that the mobility management unit judges whether it is necessary to initiate the bearer deletion by the S-GW may also not be executed, and the following operation can be executed directly.

Wherein the character of the above ISR deactivation, i.e., ISR deactivation scenarios, may comprise the following: the ISR deactivation caused by the detachment resulted from UE power-off, a kind of the network detachment initiated by the mobility management unit or an HSS, and a network element shift resulted from the change of users' location.

A technical solution of the present invention will be described in connection with particular embodiments.

Method Embodiment 1

In this embodiment, the UE power-off results in the network detachment, the mobility management unit determines that the bearer deletion is initiated by the S-GW, thus carries, in the request message of deleting bearer sent to the S-GW, instruction information to instruct the S-GW to initiate the deleting bearer request to the other mobility management unit associated with the ISR function activation. Thereafter, the S-GW initiates the deleting bearer request to the other mobility management unit associated with the ISR function activation according to this instruction information, and the other mobility management unit associated with the ISR function activation performs the bearer deletion in response to the deleting bearer request, and returns a response message and sets its ISR state as deactivation.

Figure 2:
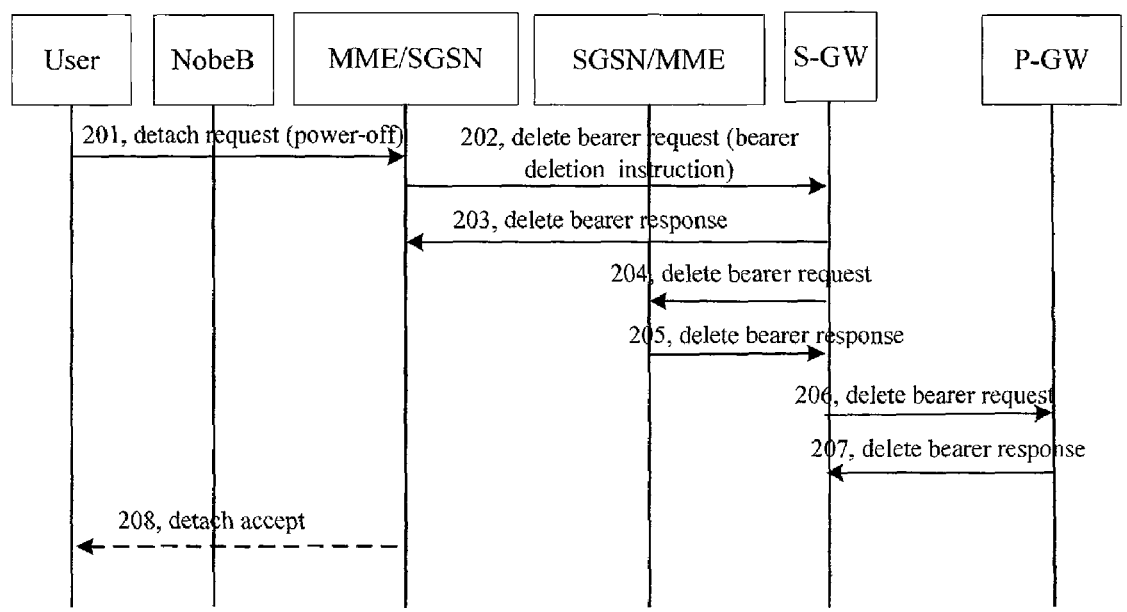
FIG. 2 is the flow chart of Embodiment 1 of a method for deactivating ISR according to an embodiment of the present invention.

FIG. 2 is the flow chart of Embodiment 1 of a method for deactivating ISR according to an embodiment of the present invention. As shown in FIG. 2, the realization mode of the ISR deactivation in the scenario of the network detachment resulted from the UE power-off comprises is illustrated, the realization mode comprises the following steps (Step S201-Step S208):

Step S201, the UE with the activated ISR powers off, and all the registration in the network should be detached; therefore, a detach request is initiated to the mobility management unit MME/SGSN, and the mobility management unit MME/SGSN is informed that the reason of the detachment is power-off via the parameters in the detach request. At this time, the UE records the ISR state of it as deactivation.

After the mobility management unit MME/SGSN has known that the reason of the detachment is the power-off, the subsequent processing mode may be the following two ways:

First, the mobility management unit MME/SGSN determines to perform the deletion of bearer information in the other registration region by means of detachment information, then no bearer deletion instruction is added in the request message of bearer deletion.

Second, the mobility management unit MME/SGSN adds the bearer deleting instruction to the request message of bearer deletion.

The following processing is described by take the second way as example.

Step S202, the mobility management unit MME/SGSN deletes the bearer information of the UE in the current registration region by sending the request message of deleting bearer to the S-GW. If it is determined to use the way that the S-GW initiates the bearer deletion to perform the deletion of the bearer information to the other registration region, the bearer deleting instruction is added into the request message of bearer deleting of this step. At this time, the mobility management unit MME/SGSN sets its ISR state as deactivation.

Step S203, the S-GW sends a bearer deleting response to the mobility management unit MME/SGSN after deleting the bearer information of the UE in the current region. At this time, the S-GW records its ISR state as deactivation.

Step S204, the S-GW will send a deleting bearer request to the other mobility management unit SGSN/MME associated with the ISR function activation when it receives an instruction to perform the deletion of the bearer information to the other registration region.

Step S205, after the other mobility management unit associated with the ISR function activation SGSN/MME deletes the corresponding bearer information, it returns a deleting bearer response to the S-GW and sets its ISR state as deactivation.

Step S206, if all the bearer information related to the UE in the S-GW has been deleted, the deleting bearer request is initiated to a P-GW, and the tunnel and bearer information between the S-GW and the P-GW are deleted.

Step S207, the P-GW returns a deleting bearer response to the S-GW to confirm that the bearer information of this tunnel is deleted.

Step S208, the mobility management unit MME/SGSN optionally returns a detach accept message to the UE according to the reasons of the detachment.

In the embodiments described hereinafter, the mobility management unit determines that it is unnecessary to initiate the bearer deletion by the S-GW, thus different from Embodiment 1, the following embodiments do not need to add the instruction information, but need to inform the other mobility management unit associated with the ISR function to execute the ISR deactivation. In order to inform the other mobility management unit associated with the ISR function activation, the following two ways may be employed:

First, the mobility management unit sends a request message of deleting bearer to the S-GW, and carries, in the request message, the instruction information which is used to instruct the S-GW to inform the other mobility management unit associated with the ISR function activation to perform the ISR deactivation operation.

In this way, the S-GW will delete the bearer information of the UE in current registration region, sends a deleting bearer response to the mobility management unit, and records its ISR state as deactivation; after receiving the ISR deactivation notification instruction, the S-GW sends an ISR deactivation notification message to the other mobility management unit associated with the ISR function activation, which is used to notify the other mobility management unit associated with the ISR function activation to execute the ISR deactivation.

Second, the mobility management unit sends the ISR deactivation notification to the other mobility management unit associated with the ISR function activation, which is used to notify the other mobility management unit associated with the ISR function activation to perform the ISR deactivation.

Method Embodiment 2

Figure 3:
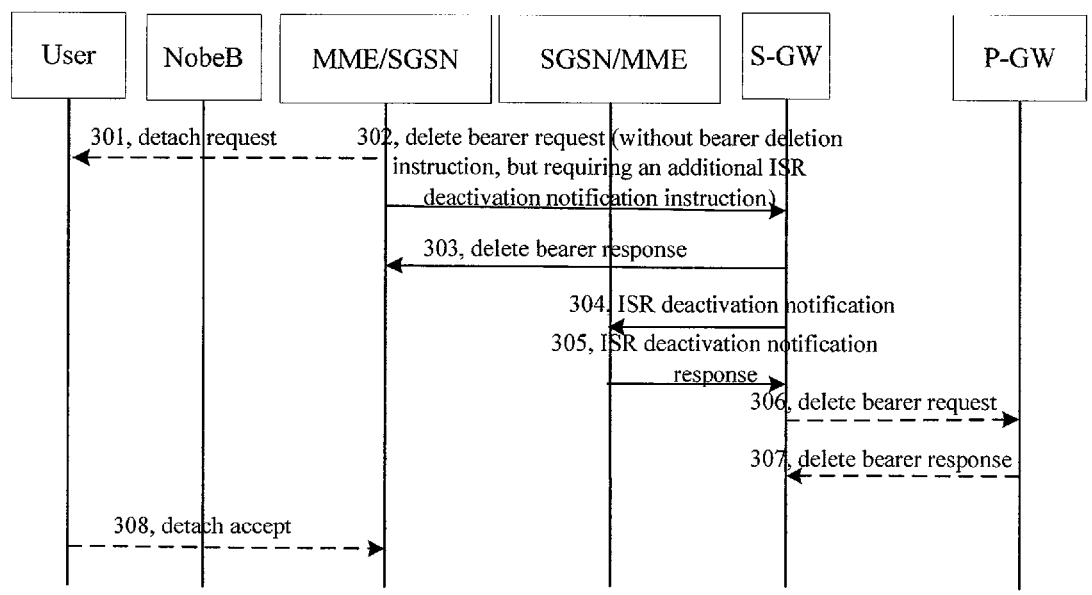
FIG. 3 is the flow chart of Embodiment 2 of a method for deactivating ISR according to an embodiment of the present invention.

In this embodiment, the mobility management unit initiates the detachment and the above first way is used to perform notification. FIG. 3 is the flow chart of Embodiment 2 of the method for deactivating ISR according to an embodiment of the present invention. As shown in FIG. 3, the realization way of the ISR deactivation in the scenario of network detachment initiated by the MME/SGSN comprises the following steps (Step S301-Step S308):

Step S301, the mobility management unit MME/SGSN initiates the detachment of the UE due to the reasons such as subscription change or unable to detect the UE for a long time, if the detachment is performed in an explicit way, a detach request message is sent to the UE, at this time, the UE records its ISR state as deactivation; if the detachment is performed in a implicit way, the detach request message will not been sent in the step, the ISR deactivation state of the UE will be synchronized with the network side in the next registration/update process.

Step S302, the mobility management unit MME/SGSN in the current registration region of the UE acquires that this detachment is only an access technology detachment, thus the bearer deletion instruction will not been carried in the deleting bearer request initiated to the S-GW, but there is a need for an additional ISR deactivation notification to instruct the S-GW to initiate an ISR deactivation notification message to the other management unit SGSN/MME associated with the ISR function. At this time, the mobility management unit MME/SGSN records its ISR state as deactivation.

Step S303, the S-GW sends a deleting bearer response to the mobility management unit MME/SGSN after deleting the bearer information of the UE in the current region, and records its ISR state as deactivation.

Step S304, after the S-GW receives an ISR deactivation notification instruction, the S-GW sends the ISR deactivation notification message to the other mobility management unit SGSN/MME associated with the ISR function activation to inform an additional network element the ISR deactivation.

Step S305, the other mobility management unit returns an ISR deactivation notification response to the S-GW and records its ISR state as deactivation.

Step S306, if all the bearer information related to the UE in the S-GW has been deleted, the deleting bearer request is initiated to the P-GW, and the tunnel and bearer information between the S-GW and the P-GW are deleted.

Step S307, the P-GW returns a deleting bearer request to the S-GW to confirm that the bearer information of this tunnel has been deleted.

Step S308, if the detachment is executed in an explicit way, the UE returns detachment confirmation information to the mobility management unit MME/SGSN. If the detachment is executed in an implicit way, the detach confirmation information will not been sent in this step.

Method Embodiment 3

Figure 4:
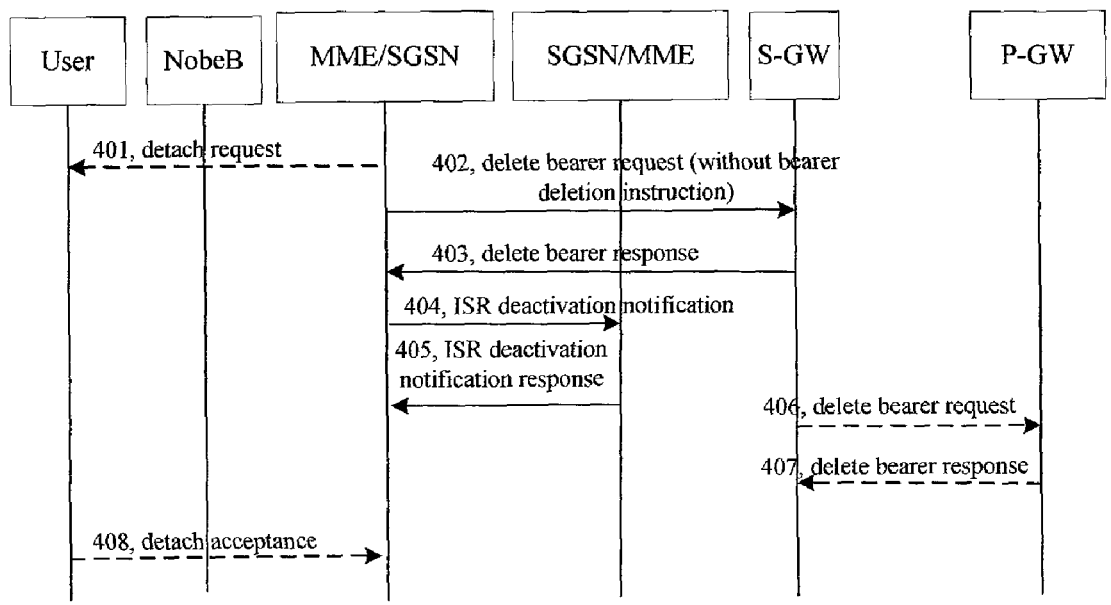
FIG. 4 is the flow chart of Embodiment 3 of a method for deactivating ISR according to an embodiment of the present invention.

In the embodiment, the mobility management unit initiates the detachment and the above second way is used, i.e., the deactivation notification message is added to perform notification. FIG. 4 is the flow chart of Embodiment 3 of the method for deactivating ISR according to an embodiment of the present invention. As shown in FIG. 4, the realization way of the ISR deactivation in the scenario of network detachment initiated by the MME/SGSN is illustrated; the realization way comprises the following steps (Step S401-Step S408):

Step S401, the mobility management unit MME/SGSN initiates a detachment to the UE due to the reasons such as subscription change or unable to detect the UE for a long time, if the detachment is performed in an explicit way, the detach request message is sent to the UE, at this time, the UE records its ISR state as deactivation; if the detachment is performed in a implicit way, the detach request message will not been sent in the step, the ISR deactivation state of the UE will be synchronized with the network side in the next registration/update process.

Step S402, the mobility management unit MME/SGSN in the current registration region of the UE acquires that this detachment is merely an access technology detachment, thus the bearer deletion instruction is not carried in the bearer deleting request, but there is a need for an additional ISR deactivation notification message (i.e., the message in Step S404) to instruct the other SGSN/MME to perform the ISR deactivation. At this time, the MME/SGSN records its ISR state as deactivation.

Step S403, after the S-GW deleting the bearer information of the UE in the current registration region, the S-GW sends a deleting bearer response to the mobility management unit MME/SGSN, and records its ISR state as deactivation.

Step S404, the mobility management unit MME/SGSN in the current registration region of the UE acquires that this detachment is merely an access technology detachment, thus the MME/SGSN sends an ISR deactivation notification message to the other mobility management unit SGSN/MME associated with the ISR function activation to instruct the other network element the ISR deactivation to change its ISR activation state.

It is to be noted that there is no limitation to the execution order of Step S402 and Step S404.

Step S405, the other mobility management unit returns an ISR deactivation notification response to mobility management unit MME/SGSN in the current registration region of the UE and records its ISR state as deactivation.

Step S406, if all the bearer information related to the UE in the S-GW has been deleted, the deleting bearer request is initiated to the P-GW, and the tunnel and bearer information between the S-GW and the P-GW are deleted.

Step S407, the P-GW returns a deleting bearer response to the S-GW to confirm that the bearer information of this tunnel has been deleted.

Step S408, if the detachment is executed in an explicit way, the UE returns detach confirmation information to the mobility management unit MME/SGSN. If the detachment is executed in an implicit way, the detachment confirmation information will not be sent in the step.

Method Embodiment 4

Figure 5:
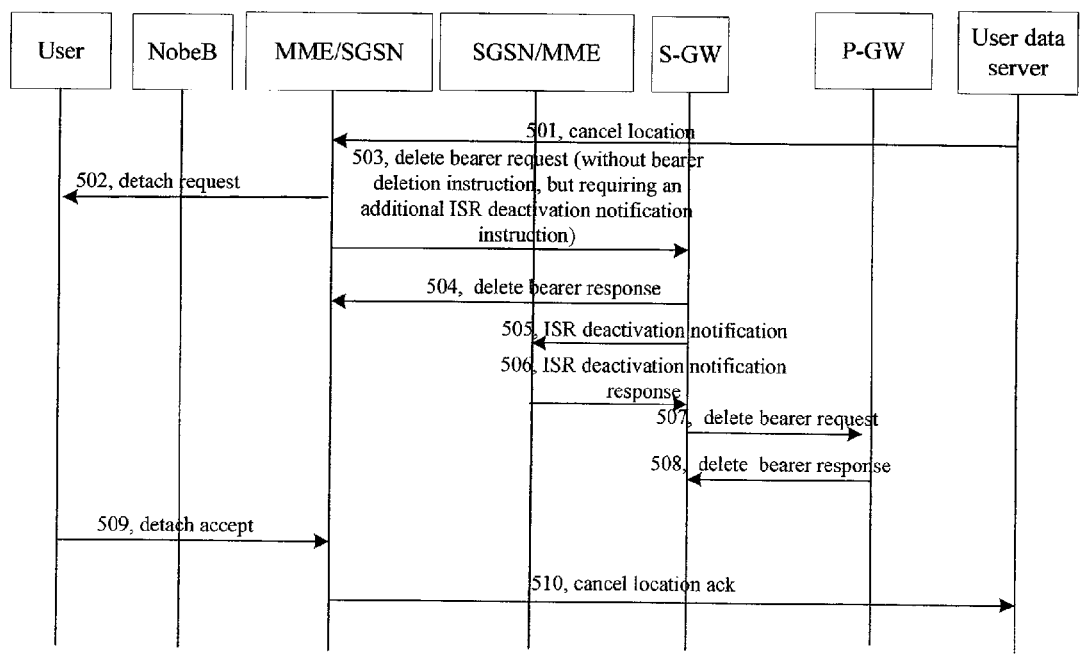
FIG. 5 is the flow chart of Embodiment 4 of a method for deactivating ISR according to an embodiment of the present invention.

In the embodiment, the network detachment is initiated by the HSS, and a notification is done by the above first way. FIG. 5 is the flow chart of Embodiment 4 of a method for deactivating ISR according to an embodiment of the present invention. As shown in FIG. 5, an implementation way of the ISR deactivation in the scenario of network detachment initiated by the HSS comprises the following steps (Step S501-Step S510):

Step S501, if an operator decides to delete the registration information of users in an access technology due to the reason of subscription, a cancel location message is sent to a corresponding mobility management unit MME/SGSN, the signaling informs the identifier of the users to be detached by the mobility management unit MME/SGSN and the location cancellation type whose reason is subscription withdrawn.

Step S502, if the mobility management unit finds that the reason of the detachment process is subscription withdrawn, it will send a detach request to the UE. After the UE receives the request, the UE records its ISR state as deactivation.

Step S503, the mobility management unit MME/SGSN in the current registration region of the UE may obtain that this detachment is an access technology detachment by the location cancellation type, thus the bearer deletion instruction is not carried in the deleting bearer request initiated to the S-GW, but it is required to add an additional ISR deactivation notification instruction to inform the S-GW to initiate an ISR deactivation notification message to the other mobility management unit SGSN/MME associated with the ISR function activation. At this time, the mobility management unit MME/SGSN in the current registration region of the UE records its ISR state as deactivation.

Step S504, after the S-GW deletes the bearer information of the UE in the current registration region, the S-GW sends a deleting bearer response to the mobility management unit MME/SGSN, and records its ISR state as deactivation.

Step S505, after the S-GW receives the ISR deactivation notification instruction, the S-GW sends an ISR deactivation notification message to the mobility management unit SGSN/MME associated with the ISR function to inform the other network element the ISR deactivation, i.e., modifying the ISR activation state thereof.

Step S506, the other mobility management unit returns an ISR deactivation notification response to the S-GW and records its ISR state as deactivation.

Step S507, if all the bearer information related to the UE in the S-GW has been deleted, the deleting bearer request is initiated to the P-GW, and the tunnel and bearer information between the S-GW and the P-GW are deleted.

Step S508, the P-GW returns a deleting bearer response to the S-GW to confirm that the bearer information of this tunnel has been deleted.

Step S509, if the UE receives a detach request message from the network, it will return a detach accept response message to the network at any time after Step S502, that is to say, in the embodiment of the present invention, there is no limitation to the execution order of Step S509 and Step S503-Step S508.

Step S510, the mobility management unit MME/SGSN returns a cancel location ack message to the HSS after deleting the bearer information and the mobility management context information of the UE.

Method Embodiment 5

Figure 6:
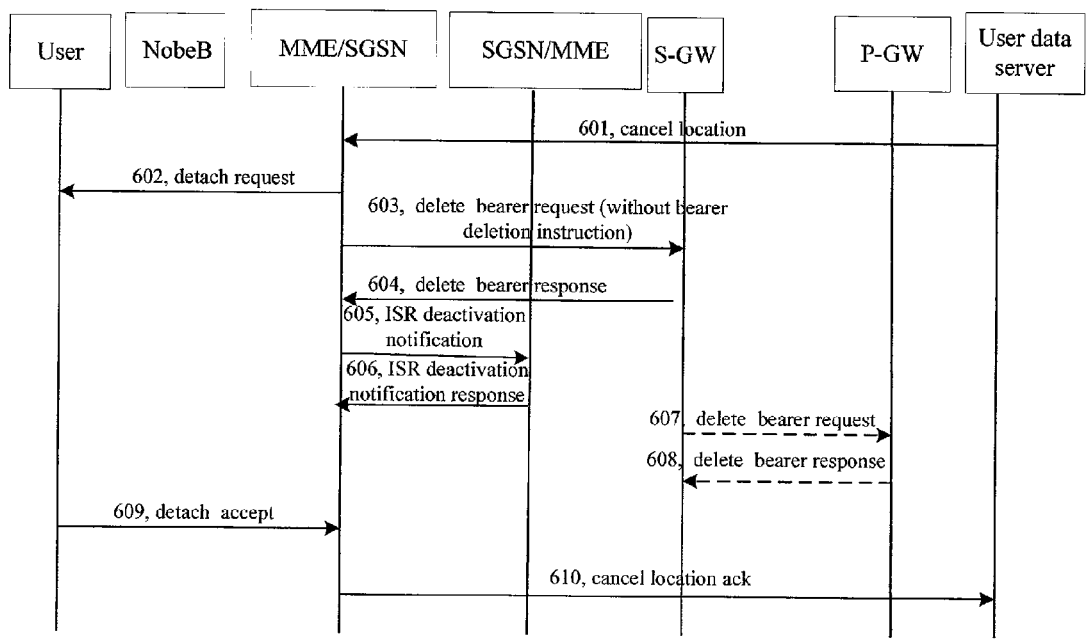
FIG. 6 is the flow chart of Embodiment 5 of a method for deactivating ISR according to an embodiment of the present invention.

In the embodiment, the network detachment is initiated by the HSS, and a notification is done in the above second way. FIG. 6 is the flow chart of Embodiment 5 of a method for deactivating ISR according to the embodiment of the present invention. As shown in FIG. 6, another implementation way of the ISR deactivation in the scenario of network detachment initiated by the HSS comprises the following steps (Step S601-Step S610):

Step S601, if an operator decides to delete the registration information of the users in an access technology due to the reason of subscription, a cancel location message is sent to the corresponding mobility management unit MME/SGSN, the signaling informs the identifier of the users to be detached by the mobility management unit MME/SGSN and the location cancellation type whose reason is subscription withdrawn.

Step S602, if the mobility management unit finds that the reason of the detachment process is subscription withdrawn, it will send a detach request message to the UE. After the UE receives the request, the UE records its ISR state as deactivation.

Step S603, the MME/SGSN in the current registration region of the UE may acquire that this detachment is merely an access technology detachment through the location cancellation type, thus the bearer deletion indication is not carried in the deleting bearer request initiated to the S-GW, but it is required to add an additional ISR deactivation notification message to inform the other SGSN/MME to perform the ISR deactivation. At this time, the MME/SGSN in the current registration region of the UE records its ISR state as deactivation.

Step S604, after the S-GW deletes the bearer information of the UE in the current registration region, the S-GW sends a deleting bearer response to the MME/SGSN, and records its ISR state as deactivation.

Step S605, the MME/SGSN sends an ISR deactivation notification message to the other SGSN/MME to inform the other network element the ISR deactivation, i.e., modifying the ISR activation state thereof.

It is to be noted that the execution order of Step S603 and Step S605 is subjected to no limitation in the embodiment of the present invention.

Step S606, the other SGSN/MME returns an ISR deactivation notification response and records its ISR state as deactivation.

Step S607, if all the bearer information related to the UE in the S-GW has been deleted, a deleting bearer request is initiated to the P-GW, and the tunnel and bearer information between the S-GW and the P-GW are deleted.

Step S608, the P-GW returns a deleting bearer response to the S-GW to confirm that the bearer information of this tunnel has been deleted.

Step S609, if the UE receives a detach request message from the network, it will return a detach accept response message to the network at any time after Step S602, that is to say, in the embodiment of the present invention, there is no limitation to the execution order of Step S609 and Step S603-Step S608.

Step S610, the mobility management unit MME/SGSN returns a cancel location ack message to the HSS after deleting the bearer information and the mobility management context information of the UE.

Method Embodiment 6

Figure 7:
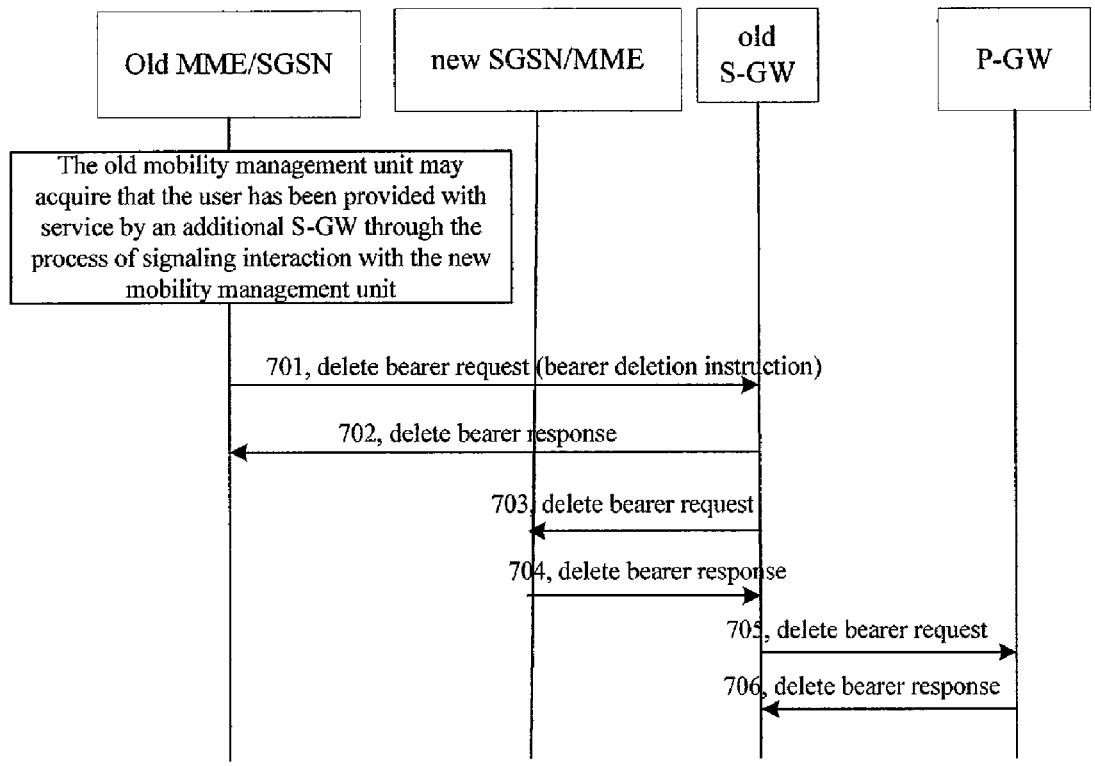
FIG. 7 is the flow chart of Embodiment 6 of a method for deactivating ISR according town embodiment of the present invention.

FIG. 7 is the flow chart of Embodiment 6 of a method for deactivating ISR according to Embodiment 6 of the present invention. As shown in FIG. 7, the implementation way of the ISR deactivation in the scenario of S-GW change comprises the following steps (Step S701-Step S706):

Due to the reason of the location change occurred when the UE shifts, the UE registers to the other new mobility management unit. This new mobility management unit may re-select a new S-GW to provide service to the UE based on the reasons such as the network topology and protocol types. In this situation, the ISR function specified by standard protocol can not be kept. In order to keep the continuity of user service, it is required to interact information between the new mobility management unit and the old mobility management unit, by this information interaction, the old mobility management unit can acquire that the S-GW serving the UE has been changed at this time.

Step S701, when the old mobility management unit acquires that the S-GW serving the UE has been changed, the old mobility management unit records its ISR state as deactivation, sends a deleting bearer request to the old S-GW, and the useless bearer information is released. Since the ISR state can not be kept at this time, a bearer deletion instruction is added to this request message to inform the S-GW to initiate a deleting bearer request to the other mobility management unit associated with the ISR activation.

Step S702, after the old S-GW deletes the bearer information associated with the old mobility management unit MME/SGSN, the old S-GW returns a deleting bearer response and records its ISR state as ISR deactivation.

Step S703, if the S-GW receives a deleting bearer request carrying the bearer deletion instruction, it initiates a deleting bearer request to the other mobility management unit associated with the ISR activation, and deletes the bearer information associated with this mobility management unit locally.

Step S704, after the other mobility management unit associated with the ISR locally deletes the information such as the mobility management context and bearer related to the user, the other mobility management unit associated with the ISR returns a deleting bearer response message to the S-GW.

Step S705, if all the bearer information related to the user in the old S-GW has been deleted, the old S-GW will initiate a deleting bearer request to the P-GW to delete the tunnel and bearer information between the S-GW and the P-GW.

Step S706, the P-GW returns a deleting bearer response to the S-GW to confirms that the bearer information of this tunnel has been deleted.

According to the embodiment of the present invention, a mobility management unit is provided, this mobility management unit may be an MME or an SGSN.

Figure 8:
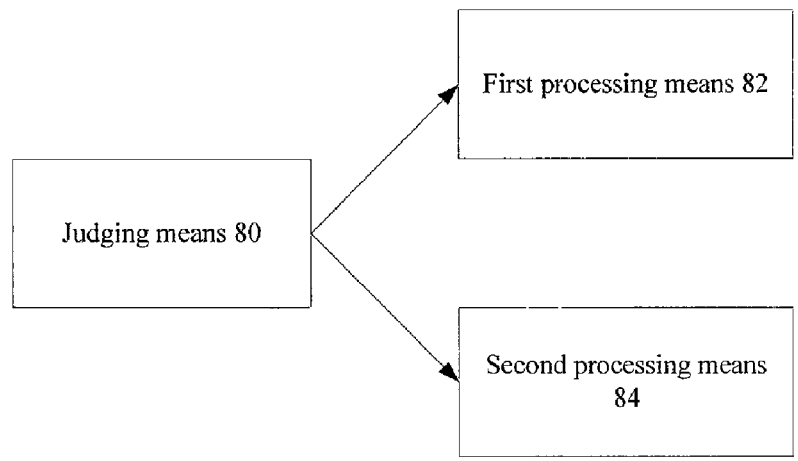
FIG. 8 is the block diagram of the structure of a mobility management unit according to an embodiment of the present invention.

FIG. 8 is the block diagram of the structure of a mobility management unit according to the embodiment of the present invention. As shown in FIG. 8, this mobility management unit comprises, judging means 80, when an ISR deactivation is needed, configured to judge the operation used according to reasons of the ISR deactivation; first processing means 82, configured to send a request message of deleting bearer to the S-GW, and to carry an identifier, in the request message, which is used to instruct the S-GW to initiate the bearer deletion to the other mobility management unit associated with an ISR function activation; second processing means 84, configured to notify the other mobility management unit associated with the ISR function activation to perform the ISR deactivation.

Wherein the judging means 80 is also configured to judge whether the reason of the ISR deactivation is a detachment resulted from the user equipment power-off or a network element shift resulted from the change of users' location, or a network detachment initiated by the mobility management unit or a home subscriber server.

When the reason of the ISR deactivation is the detachment resulted from the UE power-off or the network element shift resulted from the change of users' location, the judging means determine that it is necessary to initiate the bearer deletion by the S-GW, the mobility management unit sends a deleting bearer request message to the S-GW, and carries, in the request message, an identifier which is used to instruct the S-GW to initiate the bearer deletion to the other mobility management unit associated with the ISR function activation; when the reason of the ISR deactivation is a kind of the network detachment initiated by the mobility management unit or a home subscriber server, the judging means determine that it is unnecessary to initiate the bearer deletion by the S-GW, the mobility management unit inform the other mobility management unit associated with the ISR function activation to perform the ISR deactivation.

Wherein the above judging means is not limited to perform the operation through judging whether it is necessary to initiate the bearer deletion by the S-GW, it may directly perform the corresponding processing operation under determining any situation.

Wherein the above first processing means 82 and second processing means 84 preferably are connected to the judging means 80, and under the situation that the ISR deactivation is caused by the detachment resulted from the user equipment power-off or the network element shift resulted from the change of users' location, the first processing means is executed; under the situation that the ISR deactivation is caused by the network detachment initiated by the mobility management unit or a home subscriber server, the second processing means is executed.

It can be concluded that, by the several embodiments described above that, in the present invention, the mobility management unit judges the reasons of the ISR deactivation, then the S-GW is informed to perform corresponding operations by adding an explicit way of indication into the bearer deleting signaling, so as to realize the release of the useless bearer information and the synchronization of the ISR deactivation state, for the purpose of avoiding system resource waste and flow errors caused by the asynchronism of states.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for deactivating an Idle Mode Signaling Reduction ISR, which is applicable to a system comprising a Serving-Gateway S-GW and two mobility management units associated with ISR function activation, wherein the method comprises:
   when an ISR deactivation is needed to be performed, the mobility management unit judging whether it is necessary to initiate a bearer deletion by the S-GW according to reasons of the ISR deactivation;
   in the situation that the judging result is necessary, the mobility management unit sending a request message of deleting bearer to the S-GW, and carrying, in the request message, an identifier which is used to instruct the S-GW to initiate the bearer deletion to the other mobility management unit associated with the ISR function activation;
   in the situation that the judging result is unnecessary, the mobility management unit notifying the other mobility management unit associated with the ISR function activation to perform the deactivation.

2. The method according to claim 1, wherein the reasons of the ISR deactivation comprise: a detachment resulted from user equipment power-off, an ISR deactivation caused by a network element shift resulted from the change of users' location, and a kind of the network detachment initiated by the mobility management unit or a home subscriber server.

3. The method according to claim 2, wherein when the reason of the ISR deactivation is the detachment resulted from the user equipment power-off or the ISR deactivation caused by the network element shift resulted from the change of users' location,the mobility management unit determines that it is necessary to initiate the bearer deletion by the S-GW; when the reason of the ISR deactivation is the kind of the network detachment initiated by the mobility management unit or the home subscriber server, the mobility management unit determines that it is unnecessary to initiate the bearer deletion by the S-GW.

4. The method according to claim 3, wherein after the mobility management unit sending the request message of deleting bearer to the S-GW and carrying the identifier of bearer deletion, the method further comprises:
   the S-GW initiating a deleting bearer request to the other mobility management unit associated with the ISR function activation;
   the other mobility management unit associated with the ISR function activation executing bearer deleting in response to the deleting bearer request, returning a response message and setting its ISR state as deactivation.

5. The method according to claim 3, wherein the mobility management unit notifying the other mobility management unit associated with the ISR function activation to perform the ISR deactivation is, in particular,
   the mobility management unit sending the request message of deleting bearer to the S-GW, and carrying an instruction information, in the request message of deleting bearer, which is used to instruct the S-GW to notify the other mobility management unit associated with ISR function activation to perform the ISR deactivation;
   wherein after the mobility management unit sending the request message of deleting bearer to the S-GW, the method further comprises:
   the S-GW deleting bearer information of the user equipment in the current registration region, sending a deleting bearer response to the mobility management unit, and recording its ISR state as deactivation;
   the S-GW sending an ISR deactivation notification message to the other mobility management unit associated with the ISR function activation which is used to notify the other mobility management unit associated with the ISR function activation to perform the ISR deactivation.

6. The method according to claim 3, wherein the mobility management unit notifying the other mobility management unit associated with the ISR function activation to perform the ISR deactivation is, in particular,
   the mobility management unit sending an ISR deactivation notification to the other mobility management unit associated with the ISR function activation notification, which is used to notify the other mobility management unit associated with the ISR function activation to perform the ISR deactivation.

7. The method according to claim 2, wherein when the reason of the ISR deactivation is the detachment resulted from the user equipment power-off or the ISR deactivation caused by the network element shift resulted from change of users' location, the mobility management unit sends the request message of deleting bearer to the S-GW, and carrying, in the request message, an identifier which is used to instruct the S-GW to initiate the bearer deletion to the other mobility management unit associated with the ISR function activation; when the reason of the ISR deactivation is the kind of the network detachment initiated by the mobility management unit or the home subscriber server, the mobility management unit notifies the other mobility management unit associated with the ISR function activation to perform the ISR deactivation.

8. The method according to claim 7, wherein after the mobility management unit sending the request message of deleting bearer to the S-GW and carrying the identifier of bearer deletion, the method further comprises:
the S-GW initiating a deleting bearer request to the other mobility management unit associated with the ISR function activation;
the other mobility management unit associated with the ISR function activation executing bearer deleting in response to the deleting bearer request, returning a response message and setting its ISR state as deactivation.

9. The method according to claim 7, wherein the mobility management unit notifying the other mobility management unit associated with the ISR function activation to perform the ISR deactivation is, in particular,
the mobility management unit sending the request message of deleting bearer to the S-GW, and carrying an instruction information, in the request message of deleting bearer, which is used to instruct the S-GW to notify the other mobility management unit associated with ISR function activation to perform the ISR deactivation;
wherein after the mobility management unit sending the request message of deleting bearer to the S-GW, the method further comprises:
the S-GW deleting bearer information of the user equipment in the current registration region, sending a deleting bearer response to the mobility management unit, and recording its ISR state as deactivation;
the S-GW sending an ISR deactivation notification message to the other mobility management unit associated with the ISR function activation which is used to notify the other mobility management unit associated with the ISR function activation to perform the ISR deactivation.

10. The method according to claim 7, wherein the mobility management unit notifying the other mobility management unit associated with the ISR function activation to perform the ISR deactivation is, in particular,
the mobility management unit sending an ISR deactivation notification to the other mobility management unit associated with the ISR function activation notification, which is used to notify the other mobility management unit associated with the ISR function activation to perform the ISR deactivation.

11. The method according to claim 2, wherein after the mobility management unit sending the request message of deleting bearer to the S-GW and carrying the identifier of bearer deletion, the method further comprises:
the S-GW initiating a deleting bearer request to the other mobility management unit associated with the ISR function activation;
the other mobility management unit associated with the ISR function activation executing bearer deleting in response to the deleting bearer request, returning a response message and setting its ISR state as deactivation.

12. The method according to claim 2, wherein the mobility management unit notifying the other mobility management unit associated with the ISR function activation to perform the ISR deactivation is, in particular,
the mobility management unit sending the request message of deleting bearer to the S-GW, and carrying an instruction information, in the request message of deleting bearer, which is used to instruct the S-GW to notify the other mobility management unit associated with ISR function activation to perform the ISR deactivation;
wherein after the mobility management unit sending the request message of deleting bearer to the S-GW, the method further comprises:
the S-GW deleting bearer information of the user equipment in the current registration region, sending a deleting bearer response to the mobility management unit, and recording its ISR state as deactivation;
the S-GW sending an ISR deactivation notification message to the other mobility management unit associated with the ISR function activation which is used to notify the other mobility management unit associated with the ISR function activation to perform the ISR deactivation.
wherein in the situation that the judging result of the judging means is necessary, the first processing means is performed; otherwise, the second processing means is performed.

13. The method according to claim 2, wherein the mobility management unit notifying the other mobility management unit associated with the ISR function activation to perform the ISR deactivation is, in particular,
the mobility management unit sending an ISR deactivation notification to the other mobility management unit associated with the ISR function activation notification, which is used to notify the other mobility management unit associated with the ISR function activation to perform the ISR deactivation.

14. The method according to claim 1, wherein after the mobility management unit sending the request message of deleting bearer to the S-GW and carrying the identifier of bearer deletion, the method further comprises:
the S-GW initiating a deleting bearer request to the other mobility management unit associated with the ISR function activation;
the other mobility management unit associated with the ISR function activation executing bearer deleting in response to the deleting bearer request, returning a response message and setting its ISR state as deactivation.

15. The method according to claim 1, wherein the mobility management unit notifying the other mobility management unit associated with the ISR function activation to perform the ISR deactivation is, in particular,
the mobility management unit sending the request message of deleting bearer to the S-GW, and carrying an instruction information, in the request message of deleting bearer, which is used to instruct the S-GW to notify the other mobility management unit associated with ISR function activation to perform the ISR deactivation;

wherein after the mobility management unit sending the request message of deleting bearer to the S-GW, the method further comprises:

the S-GW deleting bearer information of the user equipment in the current registration region, sending a deleting bearer response to the mobility management unit, and recording its ISR state as deactivation;

the S-GW sending an ISR deactivation notification message to the other mobility management unit associated with the ISR function activation which is used to notify the other mobility management unit associated with the ISR function activation to perform the ISR deactivation.

16. The method according to claim 1, wherein the mobility management unit notifying the other mobility management unit associated with the ISR function activation to perform the ISR deactivation is, in particular, the mobility management unit sending an ISR deactivation notification to the other mobility management unit associated with the ISR function activation notification, which is used to notify the other mobility management unit associated with the ISR function activation to perform the ISR deactivation.

17. The method according to claim 1, wherein the mobility management unit is a mobility management entity or a serving GPRS support node.

18. A mobility management unit, comprising:

judging means, when an Idle Mode Signaling Reduction ISR deactivation is needed, configured to judge whether it is necessary to initiate a bearer deletion by a Serving-Gateway S-GW according to reasons of the ISR deactivation;

first processing means, configured to send a request message of deleting bearer to the S-GW, and to carry an identifier, in the request message, which is used to instruct the S-GW to initiate the bearer deletion to the other mobility management unit associated with an ISR function activation;

second processing means, configured to notify the other mobility management unit associated with the ISR function activation to perform the ISR deactivation;

wherein in the situation that the judging result of the judging means is necessary, the first processing means is performed; otherwise, the second processing means is performed.

19. The mobility management unit according to claim 18, wherein the judging means is also configured to judge whether the reasons of the ISR deactivation is a detachment resulted from the user equipment power-off or a network element shift resulted from the change of users' location, or a network detachment initiated by the mobility management unit or a home subscriber server;

wherein when the ISR deactivation is caused by the detachment resulted from the user equipment power-off or the network element shift resulted from the change of a user location, the first processing means is performed; when the ISR deactivation is caused by the network detachment initiated by the mobility management unit or a home subscriber server, the second processing means is performed.

20. The mobility management unit according to claim 18, wherein the mobility management unit is a mobility management entity or a serving GPRS support node.

* * * * *

UNITED STATES PATENT AND TRADEMARK OFFICE
CERTIFICATE OF CORRECTION

PATENT NO. : 8,351,378 B2
APPLICATION NO. : 13/002138
DATED : January 8, 2013
INVENTOR(S) : Jing Wang et al.

It is certified that error appears in the above-identified patent and that said Letters Patent is hereby corrected as shown below:

Column 16, Claim 12, Lines 32-35 delete "wherein in the situation that the judging result of the judging means is necessary, the first processing means is performed; otherwise, the second processing means is performed."

Signed and Sealed this
Nineteenth Day of February, 2013

Teresa Stanek Rea
*Acting Director of the United States Patent and Trademark Office*